(12) United States Patent
So et al.

(10) Patent No.: US 6,755,034 B2
(45) Date of Patent: Jun. 29, 2004

(54) APPARATUS FOR PREVENTING OVERLOAD OF AIR CONDITIONER AND METHOD THEREOF

(75) Inventors: Min Ho So, Seoul-si (KR); Won Hee Lee, Seoul-si (KR); Chang Min Choi, Seoul (KR); Yoon Jei Hwang, Seoul (KR); Deok Huh, Buchun-si (KR); Cheol Min Kim, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 10/338,843

(22) Filed: Jan. 9, 2003

(65) Prior Publication Data

US 2003/0217557 A1 Nov. 27, 2003

(30) Foreign Application Priority Data

May 27, 2002 (KR) ................................ 10-2002-0029376

(51) Int. Cl.[7] .................................................. F25B 7/00
(52) U.S. Cl. .......................................... 62/175; 62/230
(58) Field of Search ...................... 62/175, 230, 196.2, 62/510

(56) References Cited

U.S. PATENT DOCUMENTS

| | | | | |
|---|---|---|---|---|
| 3,585,451 A | * | 6/1971 | Day ............................ | 317/13 |
| 3,633,073 A | * | 1/1972 | Day ............................ | 317/38 |
| 5,390,506 A | * | 2/1995 | Sogabe et al. ................. | 62/175 |
| 6,305,187 B1 | * | 10/2001 | Tsuboe et al. ................ | 62/505 |
| 6,408,645 B1 | * | 6/2002 | Tsuboe et al. ................ | 62/505 |
| 6,564,568 B1 | * | 5/2003 | Shen ........................... | 62/230 |
| 2003/0056534 A1 | * | 3/2003 | Tsuboe et al. ................ | 62/510 |

* cited by examiner

Primary Examiner—Marc Norman
(74) Attorney, Agent, or Firm—Greenblum & Bernstein, P.L.C.

(57) ABSTRACT

Disclosed are an apparatus for preventing an overload of an air conditioner and a method thereof. The apparatus includes current feedback units for feeding back the currents supplied to the compressors to the controller where at least one of a plurality of compressors, operated in response to currents generated from a controller for controlling an operation of the air conditioner, is in an overload state; and a comparator for sensing current differences between the currents inputted into the compressors and the currents fed back from the current feedback units. After sensing the current differences between the currents inputted into the compressors and the currents fed back from the current feedback units, the comparator determines that at least one of the compressors is in the overload state if a current difference does not exist. The controller simultaneously stops operations of the compressors, and re-operates the compressors if the overload state is relieved, thereby preventing a continuous overload state of a compressor and hence damage of a compressor.

10 Claims, 4 Drawing Sheets

APPARATUS FOR PREVENTING OVERLOAD OF AIR CONDITIONER AND METHOD THEREOF

BACKGROUND OF THE INVENTION

1. Field of the Invention

The present invention relates to an apparatus for preventing an overload of an air conditioner and a method thereof, and more particularly to an apparatus for preventing an overload of an air conditioner and a method thereof, the apparatus and method being capable of preventing a continuous overload state of a compressor and damage of a compressor in the air conditioner having a plurality of compressors.

2. Description of the Related Art

Conventionally, an air conditioner includes a compressor for changing a coolant of a low-temperature and low-pressure gas state to a coolant of a high-temperature and high-pressure gas state; a condenser for changing the coolant of the high-temperature and high-pressure gas state to a coolant of a medium-temperature and high-pressure liquid state; an expansion device for changing the coolant of the medium-temperature and high-pressure liquid state to a coolant of a low-temperature and low-pressure liquid state; and a vaporizer for changing the coolant of the low-temperature and low-pressure liquid state to a coolant of a gas state.

In a heat pump type air conditioner, operations of indoor and outdoor heat exchangers vary with a cooling or heating mode. In the heating mode, the indoor heat exchanger acts as the condenser, and the outdoor heat exchanger acts as the vaporizer. Otherwise, in the cooling mode, the indoor heat exchanger acts as the vaporizer, and the outdoor heat exchanger acts as the condenser.

A recent air conditioner can vary capacity of a compressor on the basis of a cooling or heating load using a plurality of compressors having different capacities. FIG. 1 is a view illustrating a cooling cycle of a conventional heat pump type air conditioner having two compressors. The conventional air conditioner includes first and second compressors 11 and 12 having different capacities for compressing coolants to high-temperature and high-pressure gas coolants; check valves 11a and 12a for preventing backflow of the coolants compressed by the compressors 11 and 12; a four-way valve 13 for changing roles of heat exchangers by switching paths of the coolants passing through the first and second compressors 11 and 12; an outdoor heat exchanger 14 for condensing a coolant to a medium-temperature and high-pressure liquid coolant by performing heat exchange with the coolant and outdoor air; an expansion valve 15 for decompressing the coolant passing through the outdoor heat exchanger 14 to a low-temperature and low-pressure liquid coolant; an indoor heat exchanger 16 for vaporizing the coolant passing through the expansion valve 15 and performing heat exchange with the coolant and indoor air; and an accumulator 17 for supplying only a gas coolant to the first and second compressors 11 and 12 by separating the liquid coolant from a two-phase coolant passing through the indoor heat exchanger 16.

As shown in FIG. 2, an apparatus for preventing overloads of the first and second compressors 11 and 12, according to conventional techniques of preventing an overload of a heat pump, includes a controller 20 for controlling an operation of the air conditioner; first and second compressors 11 and 12 operated by currents supplied from the controller 20; and current cutoff units 41 and 42, connected between the controller 20 and the first and second compressors 11 and 12, for cutting off the currents supplied to the first and second compressors 11 and 12 when the first and second compressors 11 and 12 are in overload states. The current cutoff units 41 and 42 are turned off according to increasing inner temperatures of the compressors where the first and second compressors 11 and 12 are abnormally operated.

Capacitors 31a and 32a are connected between the controller 20 and the first and second compressors 11 and 12 to ensure sufficient electrostatic capacitances required for the operations of the first and second compressors 11 and 12.

In the conventional apparatus for preventing the overload of the heat pump, the current cutoff unit 41 connected to the first compressor 11 is turned off when the first compressor 11 is in an overload state. The current supplied from the controller 20 is then cut off to relieve the overload of the first compressor 11. If the current cutoff unit 41 is recovered after relieving the overload of the first compressor 11, it supplies the current from the controller 20 to the first compressor 11 to operate the first compressor 11.

Further, the current cutoff unit 42 connected to the second compressor 12 is turned off when the second compressor 12 is in the overload state. After relieving the overload of the second compressor 12, the current cutoff unit 42 supplies the current from the controller 20 to the second compressor 12 to re-operate the second compressor 12.

However, where an operation of one compressor is stopped due to its overload in the conventional apparatus for preventing the overload of the air conditioner, a liquid coolant can be inputted into an operating compressor because of differential pressure across the operating compressor. Thus, there is a problem in that the operating compressor can be damaged. Further, where the operating compressor is damaged, the overload state of the compressor is prolonged.

SUMMARY OF THE INVENTION

Therefore, the present invention has been made in view of the above problems, and it is an object of the present invention to provide an apparatus for preventing an overload of an air conditioner and a method thereof, the apparatus and method being capable of preventing a continuous overload state of a compressor and hence damage of a compressor by relieving the overload state of the compressor and then re-operating a plurality of compressors after simultaneously stopping operations of the compressors when one of the compressors is in the overload state.

In accordance with one aspect of the present invention, the above and other objects can be accomplished by the provision of an apparatus for preventing an overload of an air conditioner, comprising: a controller for controlling an operation of the air conditioner; a plurality of compressors being turned on/off in response to currents supplied from the controller; current feedback units for feeding back the currents, supplied to the compressors, to the controller when the compressors are in overload states; and a comparator installed in the controller for determining the overload states of the compressors on the basis of current differences between the currents inputted into the compressors and the currents fed back from the current feedback units.

In accordance with another aspect of the present invention, there is provided a method for preventing an overload of an air conditioner, comprising the steps of: a) sensing current differences between currents, supplied from a controller controlling an operation of the air conditioner to a plurality of compressors, and currents fed back to the controller; b) determining an overload state of a compressor according to the existence of a current difference sensed at the step a); c) simultaneously stopping operations of the compressors if at least one compressor is in an overload state as a result of the determination at the step b); and d) after stopping the operations of the compressors, re-operating the compressors, if the currents are appropriately supplied to the compressors at predetermined time intervals and the current differences between the currents supplied to the compressors and the currents fed back to the controller exist.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
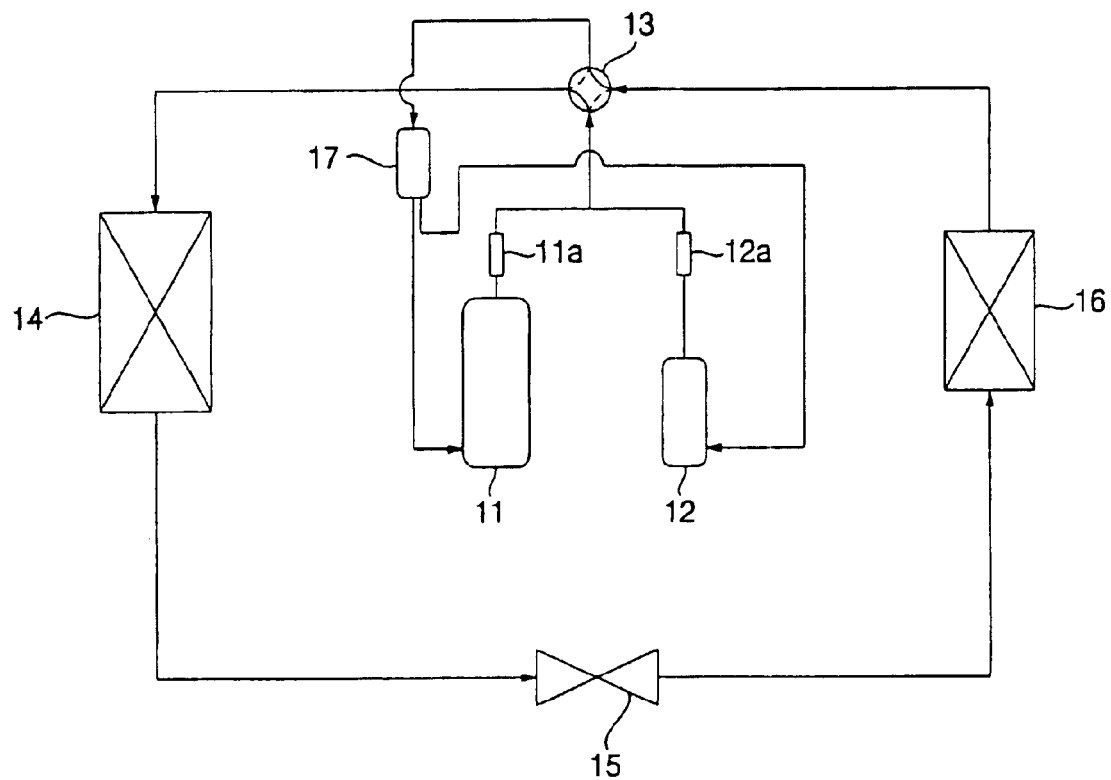
FIG. 1 is a view illustrating a cooling cycle in a conventional heat pump type air conditioner.
Figure 2:
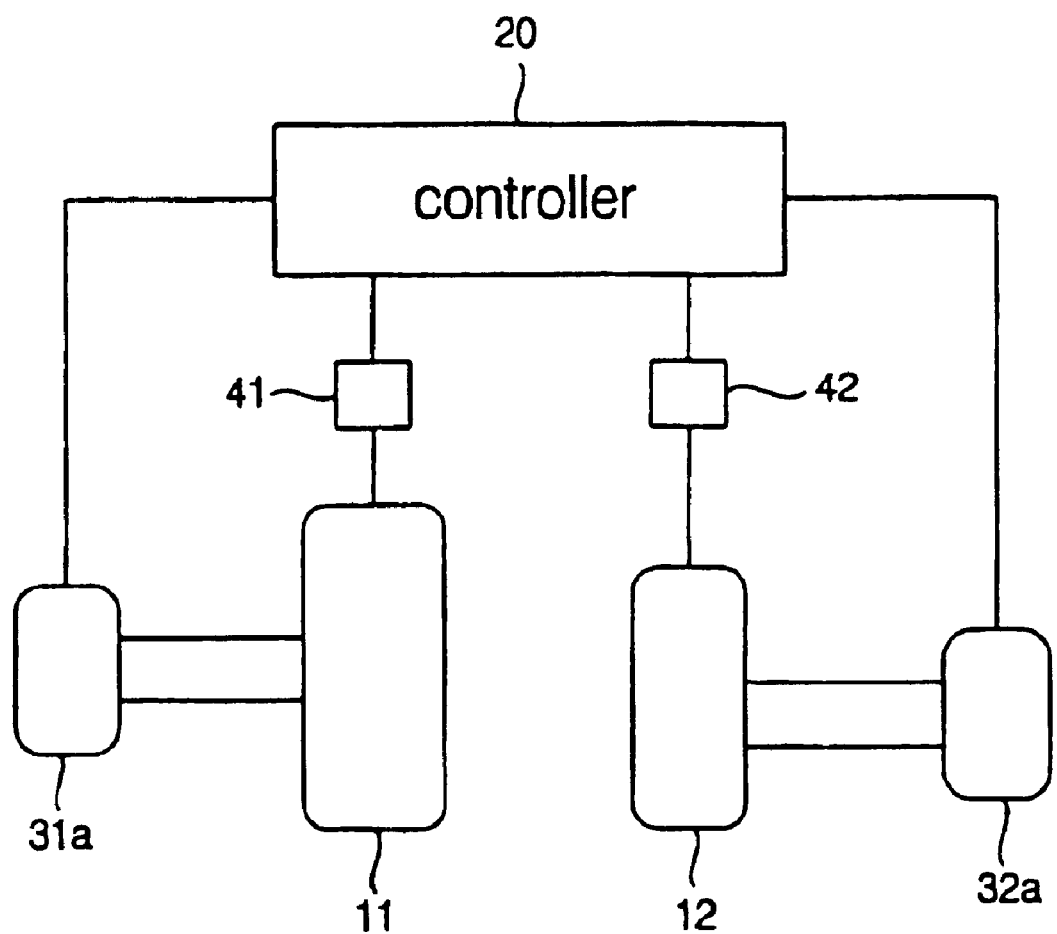
FIG. 2 is a block diagram illustrating a conventional apparatus for preventing an overload of an air conditioner.
Figure 3:
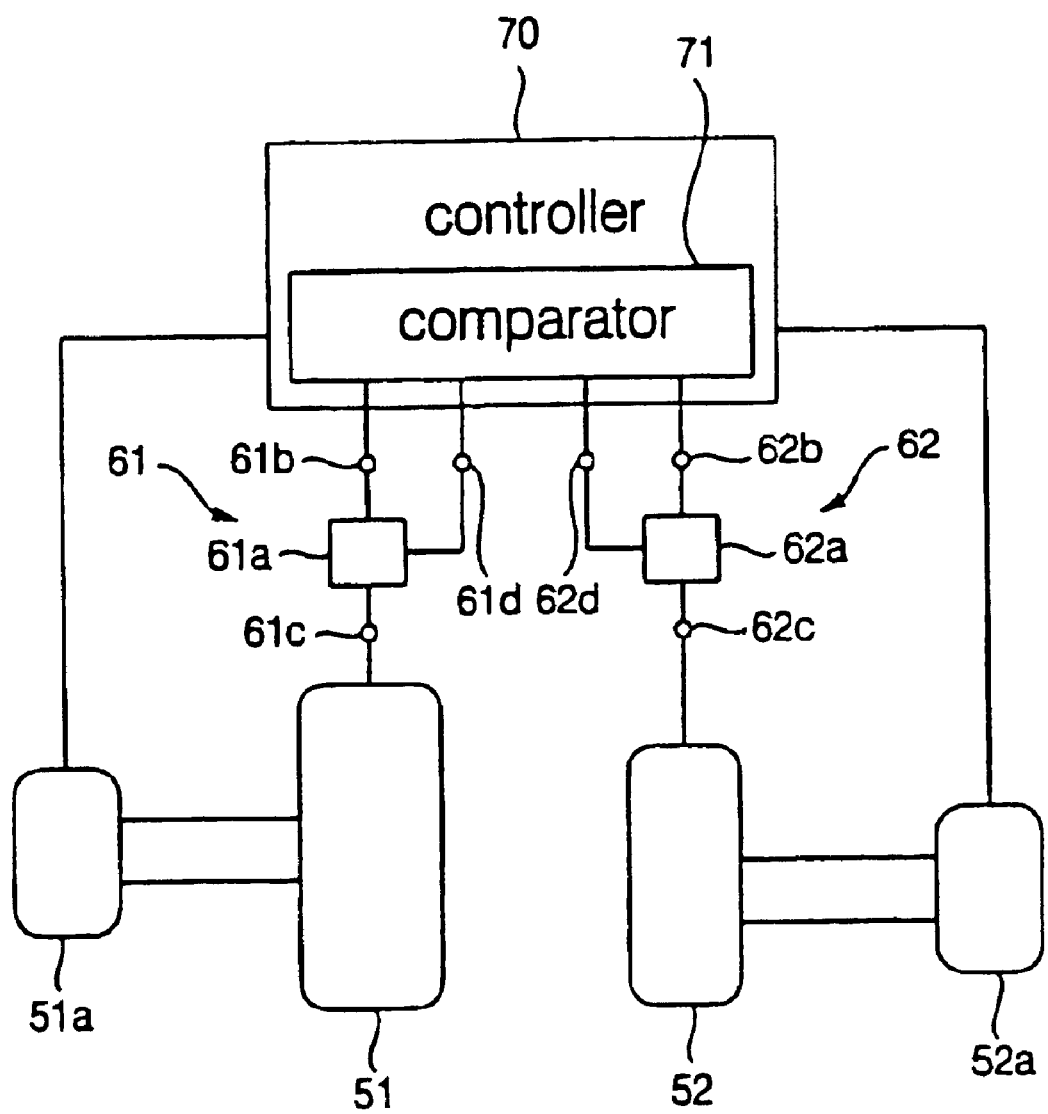
FIG. 3 is a block diagram illustrating an apparatus for preventing an overload of an air conditioner in accordance with an embodiment of the present invention.

As shown in FIG. 3, an apparatus for preventing an overload of a heat pump includes a controller 70 for controlling an operation of the heat pump; first and second compressors 51 and 52 operated in response to currents supplied from the controller 70; current feedback units 61 and 62, connected between the controller 70 and the first and second compressors 51 and 52, for supplying the currents to the first and second compressors 51 and 52, and simultaneously feeding back the currents to the controller 70 when the first and second compressors 51 and 52 are in overload states; and a comparator 71 installed in the controller 70 for sensing current differences between the currents generated from the controller 70 and the currents fed back from the current feedback units 61 and 62.

Here, the current feedback units 61 and 62 are referred to as OLPs (OverLoad Protectors). The current feedback units 61 and 62 include first connection terminals 61b and 62b for supplying the currents from the controller 70 to the first and second compressors 51 and 52; second connection terminals 61c and 62c for supplying the currents from the first connection terminals 61b and 62b to the first and second compressors 51 and 52; sensors 61a and 62a being turned off when the first and second compressors 51 and 52 are in the overload states; and third connection terminals 61d and 62d being connected to the sensors 61a and 62a when the sensors 61a and 62a are turned off in the overload states of the first and second compressors 51 and 52, and feeding back the currents, supplied to the second connection terminals 61c and 62c, to the controller 70. The sensors 61a and 62a are turned off according to increasing inner temperatures of the compressors when the first and second compressors 51 and 52 are in the overload states. In this embodiment, the sensors 61a and 62a can employ bimetals.

The controller 70 further includes the comparator 71 for sensing current differences between the currents generated from the controller 70 and inputted into the first connection terminals 61b and 62b and the currents fed back from the third connection terminals 61d and 62d of the current feedback units 61 and 62. The comparator 71 senses the current differences between the currents inputted through the first connection terminals 61b and 62b and the currents fed back through the third connection terminals 61d and 62d.

If each of the sensed current differences is a predetermined current difference or more, the comparator 71 determines that the currents supplied through the first connection terminals 61b and 62b are appropriately supplied to the first and second compressors 51 and 52 through the second connection terminals 61c and 62c. However, if a sensed current difference is not a predetermined current difference or more, and a current difference is not sensed between the first connection terminal 61b or 62b and the third connection terminal 61d or 62d, the comparator 71 determines that the first or second compressor 51 or 52 is in the overload state.

That is, where the first or second compressor 51 or 52 are in the overload state, the sensor 61a or 62a of a corresponding compressor is turned off, and hence the currents supplied through the first connection terminals 61b and 62b are fed back to the third connection terminals 61d and 62d. Thus, there is not a current difference between the current inputted through the first connection terminal 61b or 62b and the current fed back through the third connection terminal 61d or 62d.

Capacitors 51a and 52a are connected between the controller 70 and the first and second compressors 51 and 52 to ensure sufficient electrostatic capacitances required for the operations of the first and second compressors 51 and 52.

Figure 4:
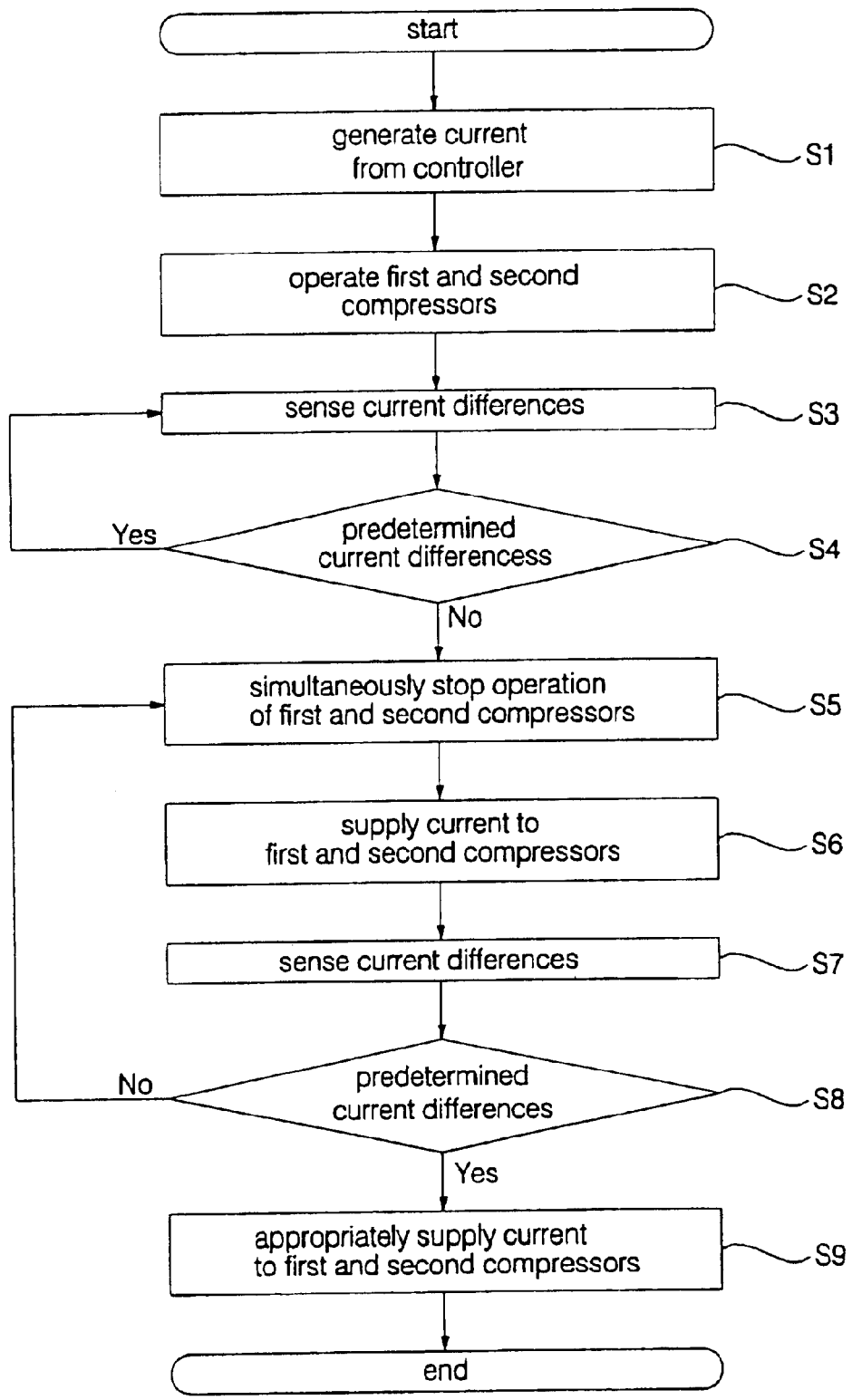
FIG. 4 is a flow chart illustrating a method for preventing an overload of an air conditioner in accordance with the present invention.

Hereinafter, a method for preventing an overload of an air conditioner will be described with reference to FIG. 4. At first steps S1 and S2, if currents are generated from the controller 70, the currents are supplied to the first and second compressors 51 and 52 through the current feedback units 61 and 62, thereby operating the first and second compressors 51 and 52.

At a second step S3, the comparator 71 senses current differences between the currents inputted into the first and second compressors 51 and 52 through the first connection terminals 61b and 62b from the controller 70 and currents fed back through the third connection terminals 61d and 62d.

At third steps S4 and S5, if a current difference sensed by the comparator 71 is less than a predetermined current difference, that is, a current difference does not exist, the controller 70 cuts off the currents supplied to the first and second compressors 51 and 52, thereby simultaneously stopping operations of the first and second compressors 51 and 52.

When the first compressor 51 is in an overload state, the sensor 61a of the current feedback unit 61 connected to the first compressor 51 is turned off, and the current supplied to the first connection terminal 61b is fed back to the comparator 71 through the third connection terminal 61d. Further, when the second compressor 52 is in the overload state, the sensor 62a of the current feedback unit 62 connected to the second compressor 52 is turned off, and the current supplied to the first connection terminal 62b is fed back to the comparator 71 through the third connection terminal 62d. In this case, there is not a current difference between the current inputted into the compressor 51 or 52 and the current fed back from the current feedback unit 61 or 62. The controller 70 simultaneously stops operations of the first and second compressors 51 and 52.

At a fourth step S6, the controller 70 inputs the currents into the first and second compressors 51 and 52 at predetermined time intervals after stopping the operations of the first and second compressors 51 and 52 at the third step.

At a fifth step S7, the comparator 71 continuously senses the current differences between the currents inputted into the first and second compressors 51 and 52 and the currents fed back from the current feedback units 61 and 62 after the currents are inputted into the compressors at the fourth step.

At sixth steps S8 and S9, the controller 70 determines that an overload of the first or second compressor 51 or 52 is relieved if the current differences sensed at the fifth step are predetermined current differences or the current differences are sensed. Thus, the controller 70 appropriately inputs the currents into the first and second compressors 51 and 52, thereby appropriately operating the first and second compressors 51 and 52.

As apparent from the above description, the present invention provides an apparatus for preventing an overload of an air conditioner and a method thereof. The apparatus of the present invention includes current feedback units for feeding back the currents supplied to the compressors to the controller where at least one of a plurality of compressors, operated in response to currents generated from a controller for controlling an operation of the air conditioner, is in an overload state; and a comparator for sensing current differences between the currents inputted into the compressors and the currents fed back from the current feedback units. After sensing the current differences between the currents inputted into the compressors and the currents fed back from the current feedback units, the comparator determines that at least one of the compressors is in the overload state if a current difference does not exist. The controller simultaneously stops operations of the compressors, and re-operates the compressors if the overload state is relieved, thereby preventing a continuous overload state of a compressor and hence damage of a compressor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for preventing an overload of an air conditioner, comprising:
   a controller for controlling an operation of the air conditioner;
   a plurality of compressors being turned on/off in response to currents supplied from the controller;
   current feedback units for feeding back the currents, supplied to the compressors, to the controller when the compressors are in overload states; and
   a comparator installed in the controller for determining the overload states of the compressors on the basis of current differences between the currents inputted into the compressors and the currents fed back from the current feedback units.

2. The apparatus as set forth in claim 1, wherein the current feedback units include:
   first connection terminals for receiving the currents from the controller;
   second connection terminals for supplying the currents received from the first connection terminals to the compressors;
   sensors connected between the first connection terminals and second connection terminals, the sensors being turned on/off according to the overload states of the compressors; and
   third connection terminals connected to the sensors for feeding back the currents, supplied to the first connection terminals, to the controller when the compressors are in the overload states.

3. The apparatus as set forth in claim 2, wherein the comparator senses the current differences between the current inputted into the first connection terminals and the currents fed back to the third connection terminals, and determines the overload states of the compressors on the basis of the sensed current differences.

4. The apparatus as set forth in claim 3, wherein the comparator determines that a compressor is in an overload state if a current difference does not exist, and determines that the compressors are appropriately operated if there are the current differences.

5. The apparatus as set forth in claim 2, wherein the sensors are turned off according to increasing inner temperatures of the compressors when the compressors are in the overload states, and enable the currents, supplied to the second connection terminals, to be fed back to the third connection terminals.

6. A method for preventing an overload of an air conditioner, comprising the steps of:
   a) sensing current differences between currents, supplied from a controller controlling an operation of the air conditioner to a plurality of compressors, and currents fed back to the controller;
   b) determining an overload state of a compressor according to the existence of a current difference sensed at the step a);
   c) simultaneously stopping operations of the compressors if at least one compressor is in an overload state as a result of the determination at the step b); and d) after stopping the operations of the compressors, re-operating the compressors, if the currents are appropriately supplied to the compressors at predetermined time intervals and the current differences between the currents supplied to the compressors and the currents fed back to the controller exist.

7. The method as set forth in claim 6, further comprising the step of:

e) cutting off current supplied to a compressor if the compressor is in the overload state before the step a), and feeding back the current to the controller.

8. The method as set forth in claim 6, wherein the step b) includes the steps of:

b1) determining that a compressor is in the overload state if a current difference is not sensed at the step a); and b2) determining that the compressors are appropriately operated if the current differences are sensed at the step a).

9. The method as set forth in claim 6, wherein the step d) includes the steps of:

d1) allowing the controller to supply the currents to the compressors at predetermined time intervals;

d2) after supplying the currents at the step d1), sensing the current differences between the currents supplied to the compressors and the currents fed back from the compressors; and d3) if the current differences are sensed at the step d2), appropriately supplying the currents to the compressors and re-operating the compressors.

10. The method as set forth in claim 9, wherein the step d) further includes the step of:

d4) maintaining stop states of the compressors if a current difference associated with a compressor is not sensed.

* * * * *